UNITED STATES PATENT OFFICE.

SIMON PENDLETON KRAMER, OF CINCINNATI, OHIO.

EMULSION.

1,207,936.     Specification of Letters Patent.     Patented Dec. 12, 1916.

No Drawing.     Application filed July 22, 1916. Serial No. 110,660.

*To all whom it may concern:*

Be it known that I, SIMON PENDLETON KRAMER, a citizen of the United States of America, and resident of Cincinnati, in the county of Hamilton and State of Ohio, have invented a new and useful Improvement in Emulsions, of which the following is a specification.

In emulsions, made according to the processes heretofore used, there is a tendency, when left to stand, for the oil and water to separate, the oil collecting near the top of the mixture and the water at the bottom thereof. To overcome this tendency, it is customary to add a gum or an albumen.

An object of my invention is to provide emulsions in which the oil and water will not separate, when left standing.

I have discovered that silicic acid, polysilicic acids, and their salts, when mixed with oil and water, produce emulsions of great permanency. This phenomenon occurs with natural oils of animal or vegetable origin.

Concrete examples of my process are: First, the production of an emulsion by combining silicate of soda, cod liver oil, and water. Second, an emulsion made from olive oil, silicate of soda, and water. In each of these concrete examples, a solution of silicate of soda, preferably one part in one thousand parts of water, is used.

The proportions of the solution of silicate of soda and of oil, vary according to the consistency it is desired to have in the emulsion. Emulsions of milk-like consistency are produced by using three parts of such a solution of silicate of soda to one part of either cod liver oil or olive oil.

What I claim is:

1. An emulsion consisting of substantially fifty per cent. by volume of oil, forty-nine per cent. by volume of water, and a soluble derivative of silica.

2. An emulsion consisting of substantially fifty per cent. by volume of oil, forty-nine per cent. by volume of water, and a soluble silicate.

3. An emulsion consisting of substantially fifty per cent. by volume of oil, forty-nine per cent. by volume of water, and a soluble alkaline silicate.

4. An emulsion consisting of substantially fifty per cent. by volume of a natural oil, forty-nine per cent. by volume of water, and a soluble alkaline silicate.

In testimony whereof, I have hereunto subscribed my name this 19th day of July, 1916.

SIMON PENDLETON KRAMER.

Witnesses:
   WALTER F. MURRAY,
   W. THORNTON BOGERT.

Copies of this patent may be obtained for five cents each, by addressing the "Commissioner of Patents, Washington, D. C."